US011067484B2

(12) United States Patent
Kirkby et al.

(10) Patent No.: US 11,067,484 B2
(45) Date of Patent: Jul. 20, 2021

(54) APPARATUS AND METHOD FOR GASEOUS FLUID SAMPLING

(71) Applicant: Smiths Detection-Watford Limited, Hertfordshire (GB)

(72) Inventors: Oliver Kirkby, Hertfordshire (GB); Alastair Clark, Hertfordshire (GB); Bruce Grant, Hertfordshire (GB)

(73) Assignee: Smiths Detection-Watford Limited, Hertfordshire (GB)

( * ) Notice: Subject to any disclaimer, the term of this patent is extended or adjusted under 35 U.S.C. 154(b) by 179 days.

(21) Appl. No.: 15/762,282

(22) PCT Filed: Sep. 30, 2016

(86) PCT No.: PCT/GB2016/053055
§ 371 (c)(1),
(2) Date: Mar. 22, 2018

(87) PCT Pub. No.: WO2017/055870
PCT Pub. Date: Apr. 6, 2017

(65) Prior Publication Data

US 2018/0266923 A1 Sep. 20, 2018

(30) Foreign Application Priority Data

Sep. 30, 2015 (GB) ..................................... 1517310

(51) Int. Cl.
*G01N 1/22* (2006.01)

(52) U.S. Cl.
CPC .................................. *G01N 1/2211* (2013.01)

(58) Field of Classification Search
None
See application file for complete search history.

(56) References Cited

U.S. PATENT DOCUMENTS 5,355,719 A 10/1994 Kohsaka et al.
7,574,930 B2 * 8/2009 Bunker .................... G01N 1/02 73/863.21

(Continued)

FOREIGN PATENT DOCUMENTS

CA 1036387 A 8/1978
RU 2390750 C2 5/2010

(Continued)

OTHER PUBLICATIONS

Spangler, Glenn E. The Pinhole Interface for IMS/MS. NASA. Johnson Space Center, Third International Workshop on Ion Mobility Spectrometry; pp. 115-133. (Year: 1995).*

(Continued)

*Primary Examiner* — Paul M. West
*Assistant Examiner* — Mark A Shabman
(74) *Attorney, Agent, or Firm* — Kevin E. West; Advent, LLP

(57) ABSTRACT

A detector inlet for providing a sample to an analytical apparatus for detecting a substance of interest, the detector inlet comprising a plenum for allowing passage of a flow of a gaseous fluid, the plenum comprising a sampling volume a sampling inlet arranged in the plenum and arranged to collect samples of the gaseous fluid from the sampling volume and to provide the samples to the analytical apparatus, wherein the flow carries particulates and a flow director arranged to create circulatory flow of the gaseous fluid around the plenum encircling the sampling inlet thereby to vary a spatial distribution of the particulates carried by the fluid to increase a relative proportion of the particulates carried past the sampling inlet without entering the sampling volume.

19 Claims, 5 Drawing Sheets

(56) References Cited

U.S. PATENT DOCUMENTS

| | | | | |
|---|---|---|---|---|
| 2004/0227073 | A1* | 11/2004 | Krasnobaev | G01N 27/622 250/288 |
| 2011/0186436 | A1* | 8/2011 | Novosselov | B01D 15/08 204/600 |
| 2012/0080593 | A1 | 4/2012 | Miki | |
| 2014/0264021 | A1* | 9/2014 | Atamanchuk | G01N 27/622 250/336.1 |
| 2015/0300927 | A1* | 10/2015 | Easton | G01N 27/622 73/863.52 |

FOREIGN PATENT DOCUMENTS

| | | | |
|---|---|---|---|
| WO | 2008116943 | A1 | 10/2008 |
| WO | 2013004903 | A1 | 1/2013 |
| WO | 2014194424 | A1 | 12/2014 |

OTHER PUBLICATIONS

International Search Report dated Dec. 22, 2016 for PCT/GB2016/053055.

Combined Search and Examination Report dated Jul. 22, 2016 for GB Appln. No. GB1517310.7.

Office Action for Russian Application No. 2018113751/05, dated Dec. 9, 2019.

Examination Report for Great Britain Application No. GB1517310.7, dated Dec. 11, 2019.

Examination Report for Great Britain Application No. GB1517310.7, dated Jul. 17, 2019.

Office Action for Russian Application No. 2018113751/05(021561), dated Dec. 9, 2019.

* cited by examiner

APPARATUS AND METHOD FOR GASEOUS FLUID SAMPLING

The present disclosure relates to detection methods and apparatus, and more particularly to methods and apparatus for obtaining samples for detectors, still more particularly to methods and apparatus for obtaining samples of vapours in the presence of particulates, these methods and apparatus may find particular application in spectrometry, for example ion mobility spectrometry and mass spectrometry.

Some detectors operate by "inhaling" a stream of fluid, such as air, into a detector inlet and sampling that air with an analytical apparatus to detect substances of interest. That inhaled stream of air can be sampled from the detector inlet using a sampling inlet such as a pinhole, capillary or membrane inlet.

Often, hand held, or portable devices may be needed for example for use by military and security personnel. These personnel frequently operate in hostile environments in the presence of large quantities of dust and grit and other particulate matter. Such particulates may obstruct the sampling inlet, or otherwise damage the detector. In some cases, particulates carried by the stream of air may comprise substances to which the detector is sensitive. If these accumulate in a detector or its inlets they may contaminate the detector, and may cause recovery time issues.

Aspects and embodiments of the present disclosure aim to address related technical problems.

Embodiments of the disclosure will now be described, by way of example only, with reference to the accompanying drawings, in which:

FIG. 1*a* shows a schematic illustration of a detector inlet;

FIG. 1*b* illustrates a spatial distribution of particulates along line 'A' shown in FIG. 1*a;*

FIG. 1*c* shows a schematic illustration of a detector inlet;

FIG. 2 shows a cross section of the detector inlet of FIG. 1*a;*

FIG. 3*a* shows a schematic illustration of a detector inlet having a cylindrical flow passage;

FIG. 3*b* illustrates a spatial distribution of particulates along the line 'B' in FIG. 3*a;*

In the drawings like reference numerals are used to indicate like elements.

Embodiments of the disclosure relate to detector inlets for providing samples to an analytical apparatus for detecting samples of interest. Such detectors may obtain samples by first inhaling a flow of gaseous fluid, such as air carrying particulates, vapour and aerosols. Samples may then be taken from this flow. For example, a pinhole inlet may be used to take these samples and to provide them into a detector to enable a substance of interest to be detected.

The particulates entrained in such an inhaled flow may be spatially distributed homogeneously throughout the inhaled flow. The presence of such particulates may lead to contamination of the detector or blockage of the sampling inlet. Embodiments of the disclosure aim to enable sampling of the vapour while inhibiting particulates from entering or clogging the sampling inlet. This may be achieved by inducing a circulatory flow which encircles (e.g. surrounds) a region from which samples can be obtained (e.g. by a sampling inlet of a detector). In this region the relative number of particulates is depleted because the otherwise largely homogeneous spatial distribution is modified by the centrifuge effect of this circulatory flow.

Figure 1A:
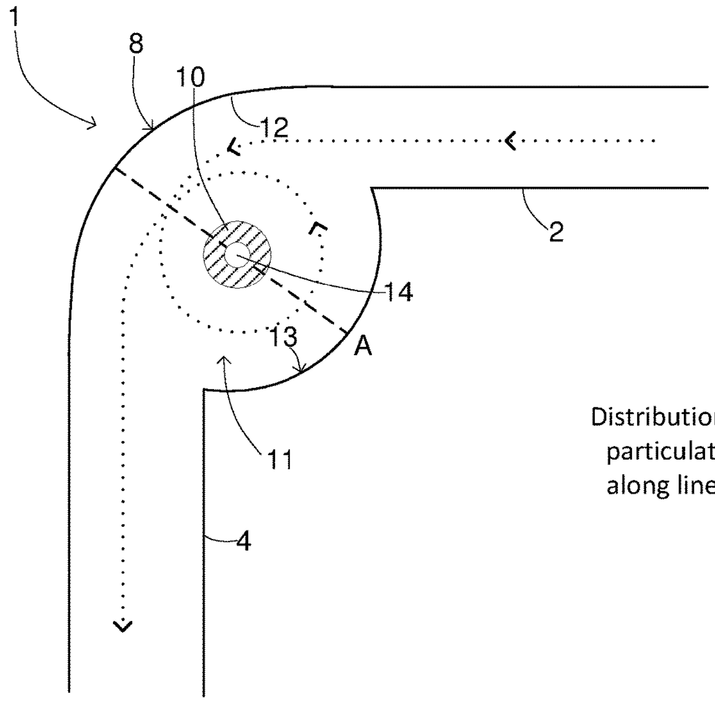

The present disclosure explains a number of ways in which this can be achieved. FIG. 1*a* shows a detector inlet that is configured to operate in this fashion.

FIG. 1*a* shows a detector inlet 1 comprising a flow inlet 2, a flow outlet 4 and a plenum 11. The plenum 11 comprises a wall 8 having an inner surface 12. A sampling inlet 14, such as a pinhole, is arranged to obtain samples from a sampling volume 10 in the plenum. FIG. 2 shows a cross sectional view of the detector inlet 1 of FIG. 1*a*. It can be seen in FIG. 2 that the sampling inlet can be arranged to collect samples of gaseous fluid from the centre region of the plenum 11. For example, in FIG. 1 the plenum is viewed in plan, with the path of inhaled flow aligned with the plane of the drawing. In this view the plenum 11 has a rounded shape, for example it is circular. The sampling inlet may be arranged in or near the middle of this rounded shaped plenum.

The flow inlet 2 and the flow outlet 4 may each comprise a conduit, such as a channel cut into a block of material and enclosed or such as a pipe or tube. The flow inlet and the flow outlet illustrated in FIG. 1 are aligned in different directions. The flow inlet 2 and flow outlet 4 are both coupled to the plenum 11, which therefore sits at a bend in the path of fluid through the detector inlet 1. At the plenum 11, the flow of gaseous fluid undergoes a change in direction as it flows from the flow inlet 2 through the plenum 11 to the flow outlet 4.

The plenum 11 comprises an internal volume bounded by the inner surface 12 of the wall 8. As illustrated, the surface 12 of the wall 8 may be curved, for example the curvature of the inner surface 12 of the wall 8 may be arranged to provide a bend in the path of the inhaled flow from the flow inlet 2 to the flow outlet 4. As illustrated in FIG. 2, the flow cross section of the plenum is greater than the flow cross section of the flow inlet 2. In this context the flow cross section refers to the area transverse to the direction of flow of the gaseous fluid. For example, the plenum 11 may provide a broadening of the flow path where the flow inlet 2 meets the plenum 11. This may act to slow the flow of gaseous fluid as it enters the plenum 11. In the illustration of FIG. 2, the flow outlet 4 is shown in plan as having a greater flow cross section than the flow inlet 4. This is one way to provide a slower flow speed in the gaseous fluid flowing out from the plenum at the flow outlet 4. Providing slower flow speed at the outlet may promote the creation of a circulatory flow around the plenum.

As explained above, the flow inlet 2 is arranged to direct the gaseous fluid into the plenum 11. The plenum 11 comprises a first flow path around the outside of the bend provided by the plenum 11 past one side of the sampling inlet, and a second flow path back around the inside of the bend, past the other side of the sampling inlet. Thus, by positioning the sampling inlet in or near the middle of the plenum 11, a circulatory flow of fluid can be induced that encircles the sampling inlet 14. This circulatory flow may vary a spatial distribution of the particulates carried by the fluid to increase a relative proportion of the particulates carried past the sampling inlet 14 without entering a sampling volume 10 from which the sampling inlet 14 obtains samples. The flow outlet 4 may be arranged so that the flow of gaseous fluid leaves the plenum 11 at a lower speed than it enters through the flow inlet 2. For example the flow outlet 4 may present a broader flow cross section to enable the same volume flow rate of gaseous fluid to flow through the outlet 4 as through the inlet 2, but at a lower linear speed. This may increase the tendency of the gaseous fluid to flow back past the sampling inlet on the inside of the bend. For example, in such embodiments fluid may flow into the plenum 11, the flow then curves around one side of the sampling inlet, is inhibited from completely entering the flow outlet 4 by the slow flowing fluid at the flow outlet 4, and at least partially recirculates in the plenum by flowing back past the sampling inlet on the other side of the sampling inlet 14.

In operation of the apparatus of FIG. 1*a*, a flow of gaseous fluid is inhaled and passed from the flow inlet 2, through the plenum 11 to the flow outlet 4. The plenum 11 provides a change in direction of this flow of inhaled gaseous fluid, for example a bend in the direction of flow from the flow inlet 2. The outside of this bend is provided by the wall 8 of the plenum which is curved inward. This changes the direction of flow of inhaled fluid, and bends the flow of fluid around the sampling inlet as it flows through the plenum 11. As it reaches the flow outlet 4, some of the gaseous fluid leaves the plenum 11 through the outlet 4, some however flows past the flow outlet 4 and remains in the plenum 11, so is guided back past the other side of the sampling inlet, on the inside of the bend 13, rather in the manner of an eddy current in a stream. When it has flowed back past the sampling inlet again to return to the flow inlet 2, this back flow may then re-join further flow arriving in the plenum 11 at the flow inlet 2. This same cycle thus begins again, and some of this re-joined flow is recirculated, whilst some leaves through the outlet 4. Accordingly, for at least part of the flow of gaseous fluid, such embodiments may increase the dwell time of the gaseous fluid around the sampling inlet as compared to the same flow along a straight pipe of constant cross section.

At least a portion of the fluid may thus flow in around the plenum, in a curved, for example at least partially circular flow path surrounding the sampling inlet, before exiting the plenum via the flow outlet 4. It can be seen in FIG. 2 that this circulatory flow circulates about a rotation axis that is transverse to, for example perpendicular to, the bulk flow direction of the gaseous fluid through the inlet 2 and outlet 4.

This circulatory flow may provide centrifuging effect around the sampling inlet which tends to cause the particulates carried by the flow to move towards the walls of the plenum, e.g. away from the sampling inlet. This provides a region towards the axis of rotation of the circulatory flow in which the proportion of particulates in the gaseous fluid is depleted with respect to other regions of the gaseous fluid flow e.g. region of the fluid flow that are closer to the walls of the plenum 11. Vapour carried by the flow however remains free to diffuse around the plenum 11, and into this depleted region. Methods of the disclosure therefore comprise collecting samples of the gaseous fluid from this depleted region to reduce the number of particulates that may clog the sampling inlet or enter through the inlet and thus contaminate the detector.

Figure 1B:
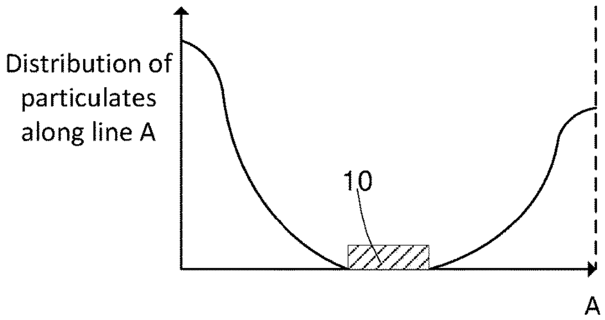
Figure 2:
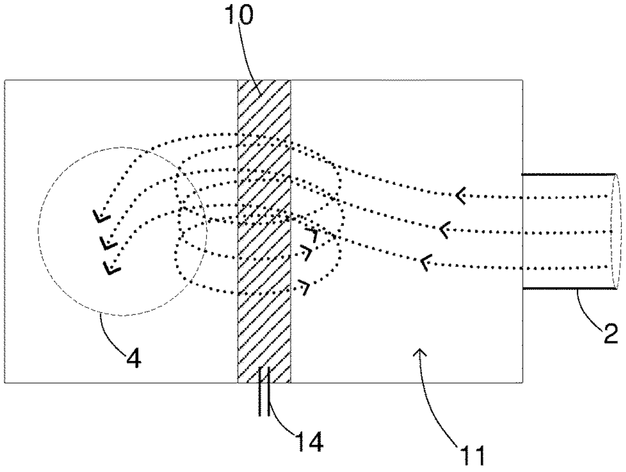

A distribution of the particulates along line A and the sampling volume 10 is illustrated in the plot in FIG. 1*b*. As shown in FIG. 1*b* the number of particulates (e.g. the number per unit volume) decreases as a function of distance from the surface 12 of the wall. For example the number of particulates is lower towards the sampling volume 10 and away from the inside of the bend 13. As described above, the centrifuge effect causes the particulates to move towards the walls of the plenum and this movement leads to the change in the number of particulates with distance from the wall towards the sampling volume. The distribution of particulates illustrated in FIG. 1*b* shows a smaller number of particulates in the region between the inside of the bend 13 and the sampling volume 10 relative to the region between the surface 12 of the wall and the sampling volume 10. Without wishing to be bound by any particular theory, it is believed that a portion of the fluid in the region between the surface 12 of the wall and the sampling volume 10 passes into the region between the inside of the bend 13 and the sampling volume 10, therefore the fluid between the inside of the bend 13 and the sampling volume 10 may have undergone a greater centrifuge effect and therefore may comprise fewer particulates. It will be appreciated however that such a distribution is merely an example.

The curvature of the wall may be selected to reduce the impaction of the particulates on internal surfaces of the detector inlet 1. For example, the radius of curvature of the wall may differ in different parts of the wall to provide a smooth path for the flow of fluid. For example, a first part of the wall adjacent the flow inlet 2 and a second part of the wall adjacent the fluid outlet 4 both have a larger radius of curvature than the portion of the wall coupling the first portion to the second portion. The change in the radius of curvature leads to a gradual change in the direction of flow of the inhaled gaseous fluid. This may reduce the tendency of particulates and aerosols carried by the gaseous fluid to impact on and accumulate on the wall of the plenum.

Figure 1C:
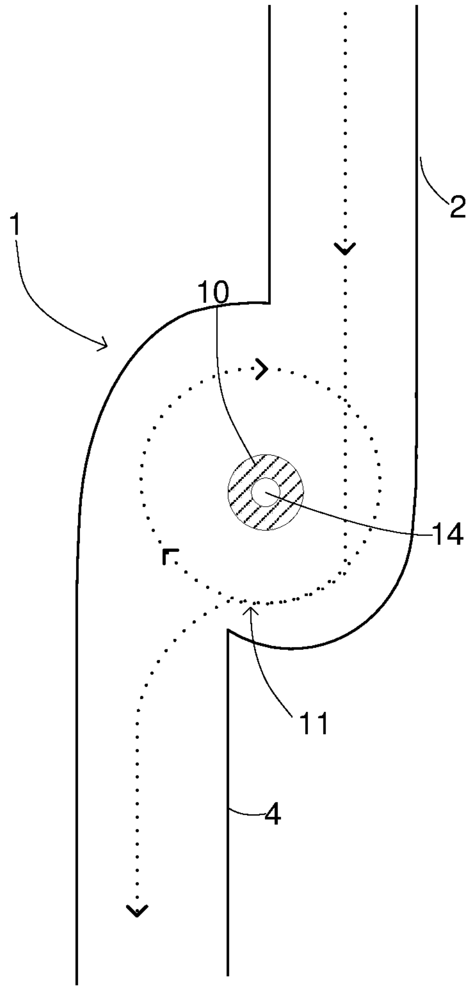

FIG. 1*c* shows an example of a detector inlet such as that described above with reference to FIG. 1*a*. In FIG. 1*c* however, the flow inlet 2 is aligned in the same direction as the fluid outlet 4. The fluid outlet 4 however is offset from the flow inlet 2. For in the example illustrated in FIG. 1*c*, the fluid outlet 4 is spaced laterally from the flow inlet, e.g. it is spaced in a direction transverse to the direction of the fluid flow. In this example, at least a portion of the fluid may flow in circles around the plenum, surrounding the sampling inlet, before exiting the plenum via the flow outlet 4 in a direction parallel to the flow inlet 2. In the example illustrated in FIG. 1*c* the flow outlet 4 is located on an opposing side of the plenum 8 to the flow inlet 2. The gaseous fluid may therefore flow out of the plenum via the flow outlet 4 in the same direction as it flows into the plenum from the flow inlet 2. In other embodiments however, the flow outlet 2 may also be located on the same side of the plenum 8 as the flow inlet 2. For example, the plenum may be located at the turn in a U-bend. These and other examples provide a circulatory flow which rotates about an axis which is transverse to the direction of flow of the gaseous fluid.

Other configurations of detector inlets may also be provided. The circulatory flow of fluid in the plenum may also circulate about an axis aligned to the flow direction. For example the, plenum may comprise a conduit or flow passage 32, such as a cylinder, arranged so that fluid can along it. In such configurations, the axis of rotation of the circulatory flow may be aligned with a longitudinal axis of the flow passage. One such example is illustrated in FIG. 3*a*.

Figure 3A:
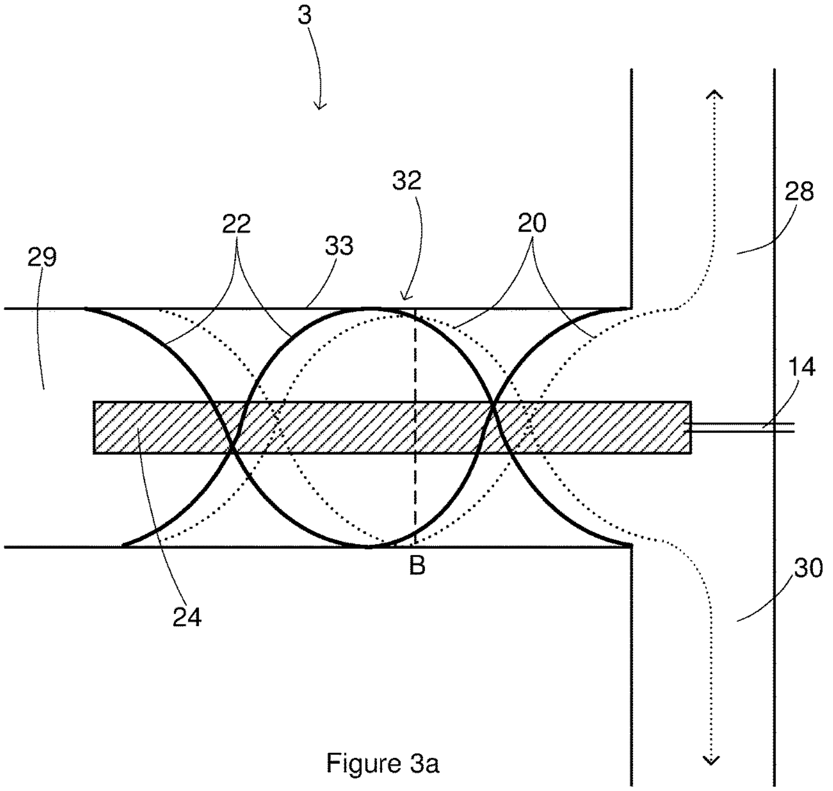

In the example illustrated in FIG. 3*a*, the detector inlet comprises a flow passage 32 arranged to provide a circulatory flow which rotates about an axis that is parallel with the direction of flow of the gaseous fluid. As explained above, this circulatory flow can provide a variation in the spatial distribution of particulates in the flow so that relatively more of them are carried by the flow nearer the wall of the flow passage. The number of particulates also decreases as a function of spacing from a wall of the flow passage.

Figure 4:
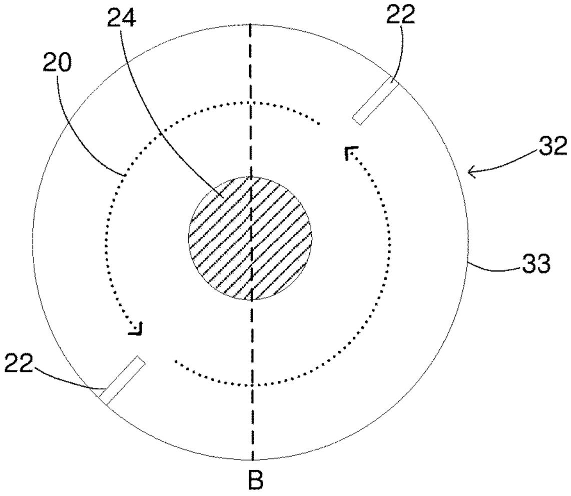
FIG. 4 shows a cross section of the detector inlet of FIG. 3*a* at the line 'B' in FIG. 3*b;*

In more detail, FIG. 3*a* shows a detector inlet having a flow passage 32, a flow inlet 29, a first flow outlet 28 and a second flow outlet 30. The flow passage 32 comprises a wall 33, a flow director in the form of fins 22 arranged on the inner surface of the wall 33 of the flow passage 32, a sampling volume 24 and a sampling inlet 14. FIG. 4 shows a cross section of the flow passage 32 of FIG. 3*a*, taken at the line marked B in FIG. 3*a*.

In the example illustrated in FIG. 3*a* and FIG. 4, the flow passage 32 comprises a conduit such as a channel cut into a block of material and enclosed or such as a pipe or tube. The flow passage 32 defines the bulk flow direction. The flow inlet 29 may comprise a part of this flow passage 32. The first flow outlet 28 and second flow outlet 30 are separated along the flow passage 32 from the flow inlet 29 and extend from the trunk in a direction away from the axis of the trunk. For example, the flow outlets 28, 30 may branch out from the flow passage 32. For example they may be arranged at an angle to the flow passage 32. They are illustrated as being arranged transverse to (e.g. perpendicular to) the flow passage 32, but in some embodiments they may be at least partially aligned with the direction of the flow passage 32. For example the flow passage and the flow outlets 28, 30 may be arranged in a Y-shape. In the example illustrated in FIG. 3*a*, the first flow outlet 28 and the second flow outlet 30 extend from the trunk in different directions, for example the first flow outlet 28 may be arranged to carry a flow of gaseous fluid in an opposite direction to the flow of fluid carried by the second flow outlet 30.

In FIG. 3*a*, the flow director comprises a fin, or fins 22, that extend from the interior wall 33 of the flow passage 32. The fin or fins 22 may be aligned with a helical path (in the manner of a screw thread around and along the flow passage 32. To act as a flow director, this fin (or fins) are in the path of at least a portion of the fluid flowing through the flow passage. In the example illustrated, the flow director is in the form of two fins 22 that are coupled to the wall of the flow passage 32. A single fin, or a greater number of fins, may also be used. The fins 22 need not be continuous, provided that they comprise thin, elongate, structures which are aligned with at least part of a helical (e.g. corkscrew) path along the flow passage. The fin (or fins) may be carried by the interior wall of the flow passage along a helical path with the axis of the helix being aligned with the flow passage 32, for example the helical path may be coaxial with the flow passage 32. The fins 22 may be fixed to the wall 33 of the flow passage 32, for example the flow passage 32 may be integrally formed with the fins 22. The fins may extend at least 10 micron from the wall 33 of the flow passage 32.

The flow passage 32 is arranged to receive a sample from the flow inlet 29. The fins 22 on the inner surface of the wall 33 of the flow passage 32 are arranged to alter the flow direction of the fluid so that the fluid flows with a circulatory flow 20 having an axis of rotation that is aligned with the bulk flow direction in the flow passage 32. The sampling inlet 14 is arranged to obtain samples from the sampling volume 24, for example as illustrated in FIG. 3*a* the sampling inlet may be located in the centre of the sampling volume. FIG. 4 shows a cross sectional view of the flow passage 32 of FIG. 3*a*. FIG. 4 shows the sample volume being coaxial to the flow passage 32 and encircled by the flow of fluid 20. The flow path 20 is illustrated in FIG. 3*a* and FIG. 4 with the circulatory flow of the fluid following the inner surface of the wall 33 and directed in an anti-clockwise direction by the fins 22.

In operation the gaseous fluid is inhaled through the flow inlet 29 through the flow passage 32 and out of the first fluid outlet 28 and the second fluid outlet 30. The flow director that extends from the interior wall 33 of the flow passage 32 changes the direction of the flow of gaseous fluid through the flow passage. As the fluid moves along the flow passage the change in direction provides a rotation to the fluid so that the flow of fluid encircles the axis of the flow passage, for example in the manner that rifling of a gun barrel induces a circulatory motion to a bullet travelling along the barrel. The gaseous fluid continues to rotate about the axis of the flow passage whilst travelling towards the first fluid outlet 28 and the second fluid outlet 30. The gaseous fluid then exits the flow passage via the first fluid outlet 28 and the second fluid outlet 30.

The circulatory fluid flow path 20 illustrated in FIG. 3*a* and FIG. 4 is a helical flow path having an axis corresponding to the flow direction along the flow passage. The flow path may be provided by the arrangement of fins 22. In the arrangement illustrated in FIG. 3*a* and FIG. 4 the fins 22 are arranged on the surface of the flow passage with the fins oriented to form a helical pattern having an axis that is coaxial with the axis of the flow passage. The fluid is therefore directed in a helical path, following the orientation of the fins 22, along the flow passage 32. In the example illustrated in FIG. 3*a* and FIG. 4 the fins are arranged in an anti-clockwise helix with respect to the fluid flow and therefore as the fluid flows along the flow passage the fluid fins rotate the fluid in an anti-clockwise direction.

The circulatory flow of the fluid in the flow passage may vary a spatial distribution of the particulates carried by the fluid. As described above the circulatory flow may increase the relative proportion of particulates carried past the sampling inlet 14 without entering the sampling volume 24 with the centrifuging effect of the circulatory flow causing the particulates to move towards the walls of the flow passage 33. The movement of the particulates towards the walls leads to a lower proportion of particulates, and therefore a greater proportion of vapour, in the sampling volume.

In the example illustrated in FIG. 3*a* the nature of the circulatory flow of the fluid is determined by the arrangement of the fins 22. For example, the number of times the fluid encircles the axis of the flow passage 32 for a given length of the flow passage 32 is determined by the position of the fins 22 on the wall 33 of the flow passage 32. An arrangement of the fins having a larger number of rotations along the length of the flow passage 32, for example the fins being arranged in a helix with a smaller pitch, may lead to a larger number of cycles of the fluid about axis of the flow passage as the gaseous fluid travels along the length of the flow passage.

Figure 3B:
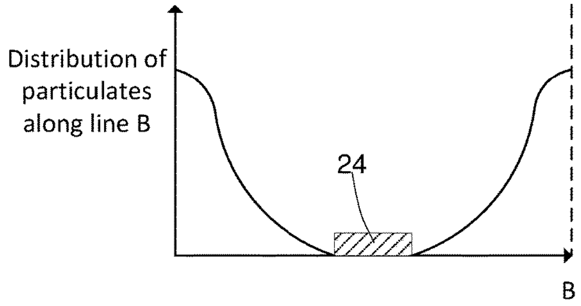

The distribution of the particulates along line B and the sampling volume 24 is illustrated in the plot in FIG. 3*b*. As shown in FIG. 3*b* the number of particulates decreases from the wall 33 of the flow passage to the sampling inlet. As described above, the centrifuge effect causes the particulates to move towards the walls 33 and this reduces the number of particulates in the sampling volume 24 that is positioned towards the axis of the flow passage 32.

The sampling inlet 14 may be coupled to the detector inlet 1 and adapted for collecting samples of the fluid from a sampling volume 10, 24 around the sampling inlet 14. In the embodiments described herein the sampling inlet used to take samples from a flow of gaseous fluid may comprise a pinhole inlet. The sampler (not shown) is configured to draw a selected volume of fluid, smaller than the sampling volume 10, 24, through the sampling inlet 14 to provide a sample to the analytical apparatus. The sampler may comprise an electromechanical actuator, for example a solenoid driven actuator, and/or a mechanical pump arranged to transfer vapour from the sampling volume 10, 24 through the sampling inlet 14 and into the analytical apparatus.

Figure 5:
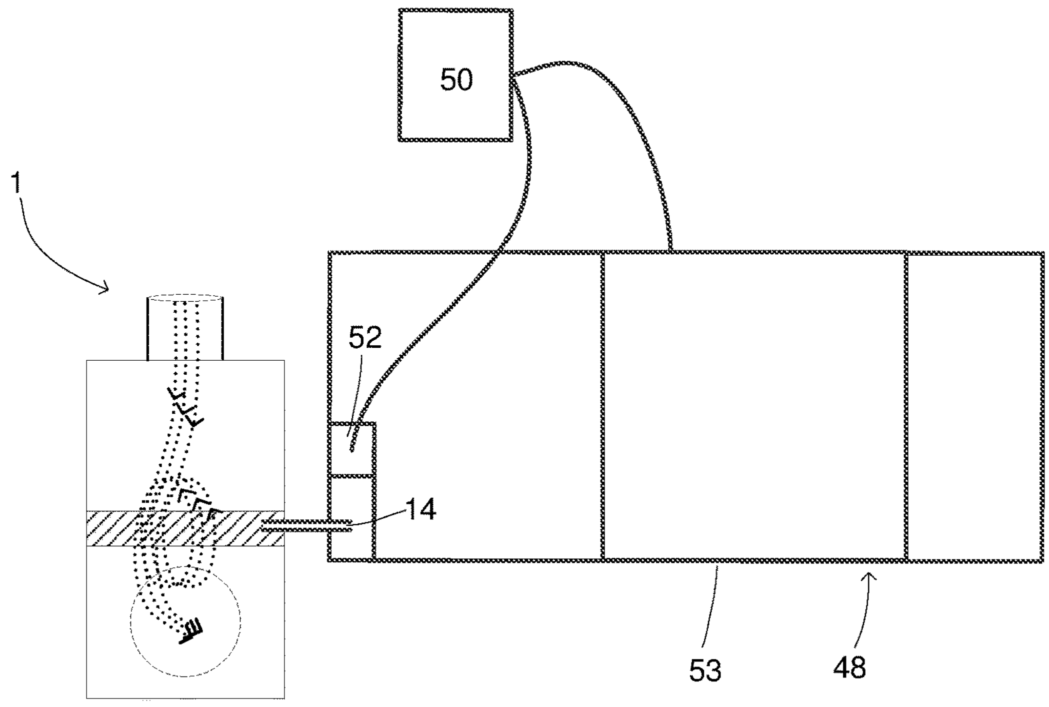
FIG. 5 illustrates an example of a detector with the detector inlet of FIG. 1*a,*
Figure 6:
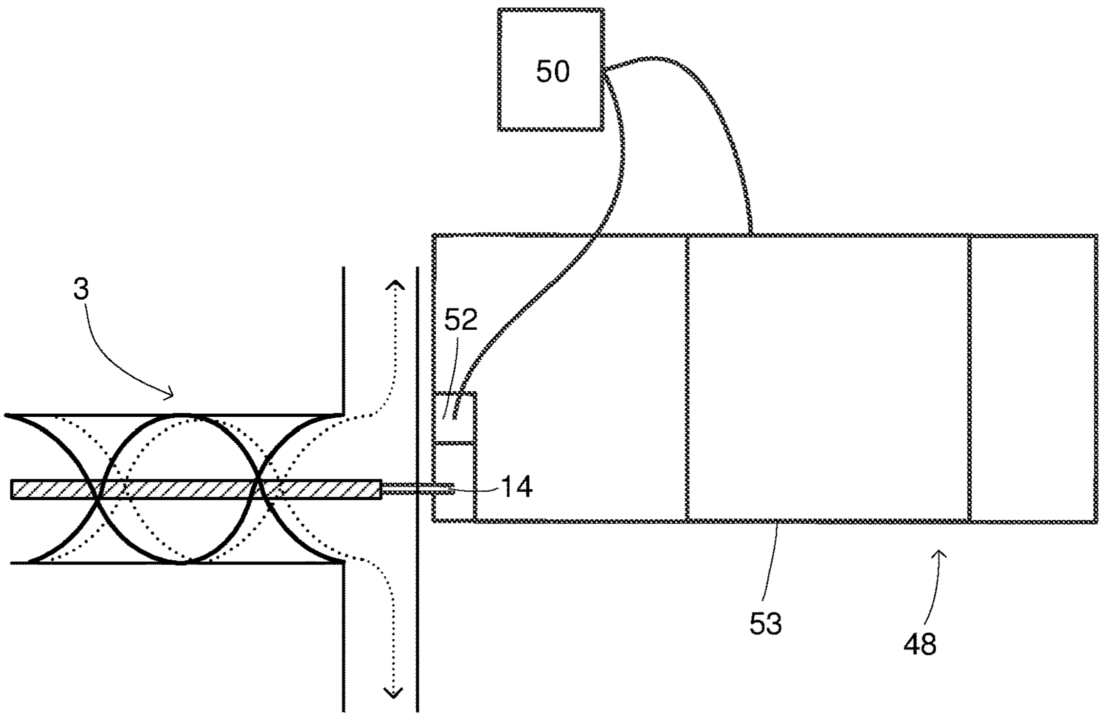
FIG. 6 illustrates an example of a detector with the detector inlet of FIG. 3*a;*

FIG. 5 shows a detector 48 coupled to the detector inlet 1 via the sampling inlet 14 and FIG. 6 shows a detector 48 coupled to the detector inlet 3 via the sampling inlet 14. The detector 48 comprises a sampler 52 arranged to obtain samples of the fluid via the sampling inlet and an analytical apparatus 53.

The analytical apparatus 53 is configured to analyse the sample received from the sampling inlet, for example to determine one or more chemicals of interest in the sample. The analytical apparatus 53 shown in FIG. 5 and FIG. 6 comprises a mass spectrometer. A mass spectrometer may comprise an ioniser, an ion accelerator, a beam focusser, a magnet, and a faraday collector arranged to perform mass spectrometry analysis on samples of vapour.

As illustrated, a controller 50 is coupled to control the analytical apparatus, the flow provider and the sampler 52. The controller 50 may comprise a processor and a memory storing instructions for operation of the detector 48.

Figure 7:
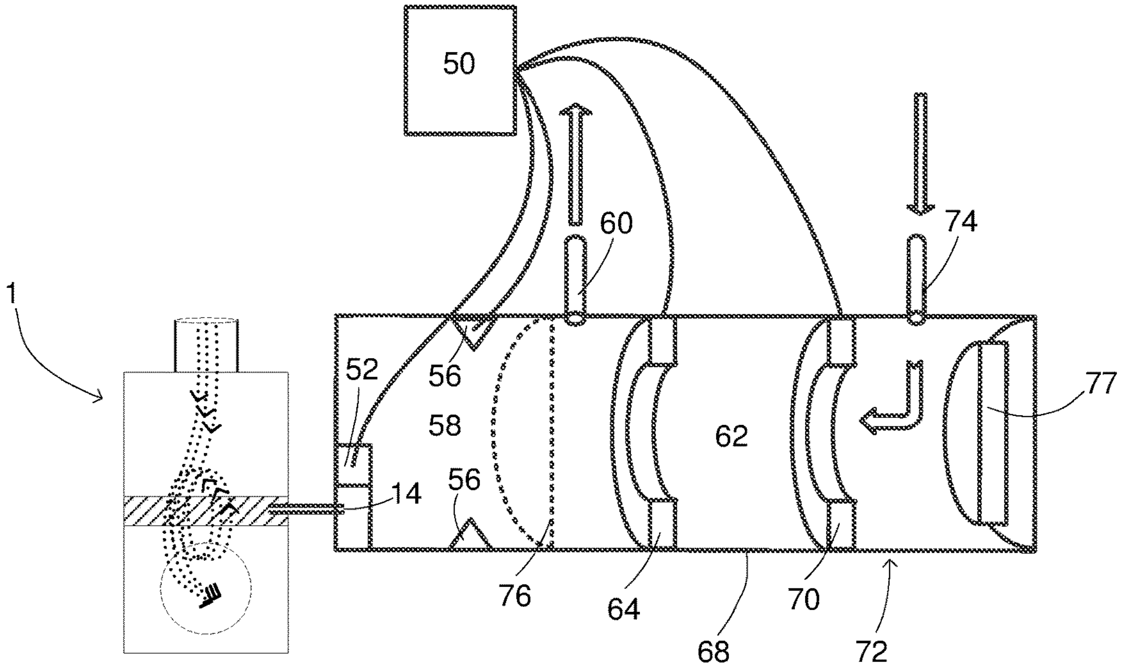
FIG. 7 illustrates another example of a detector with the detector inlet of FIG. 1*a,* and FIG. 8 illustrates another example of a detector with the detector inlet of FIG. 3*a*.
Figure 8:
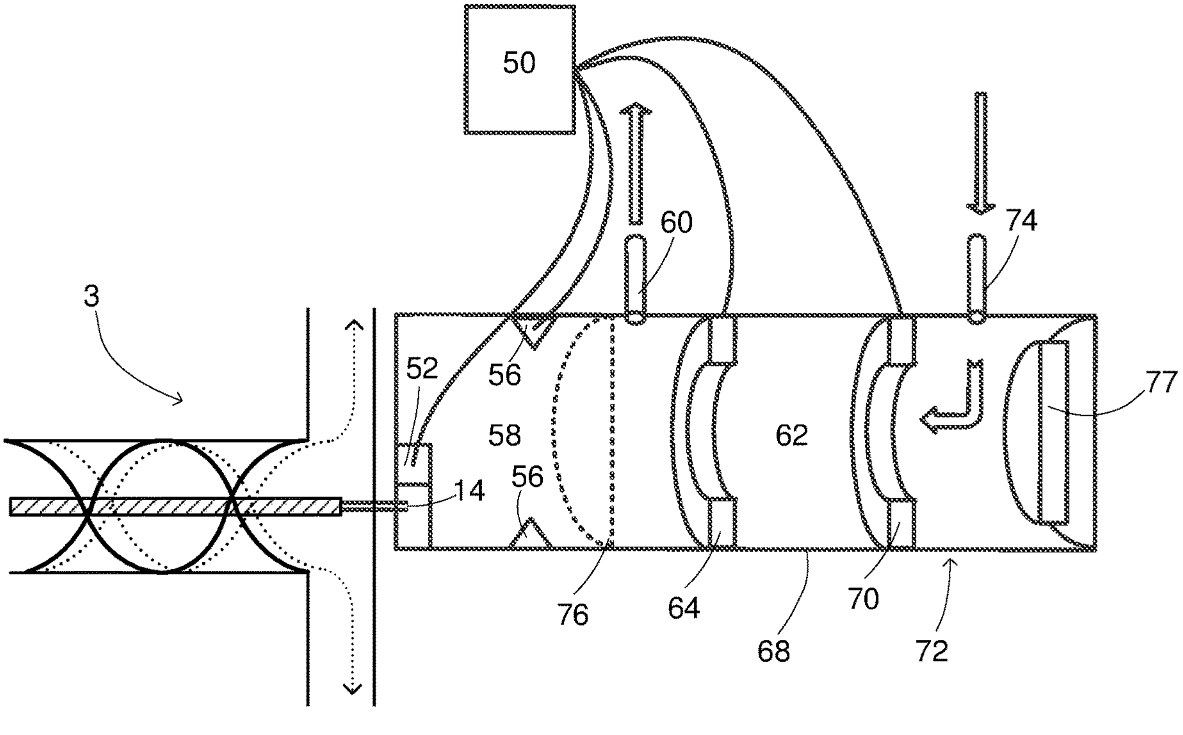

FIG. 7 and FIG. 8 shows a detector 68 in which the analytical apparatus comprises an ion mobility spectrometer 72 but which is otherwise identical to the apparatus shown in FIG. 5 and FIG. 6. The ion mobility spectrometer of FIG. 7 is coupled to a detector inlet 1 by a sampling inlet 14. The sampler 52 is arranged to obtain samples of the fluid through the sampling inlet 14 and to provide them to the ion mobility spectrometer 72. As in the example of FIG. 5 and FIG. 6, the controller 50 may comprise a processor and a memory storing instructions for operation of the detector 68. Also as in FIG. 5 and FIG. 6, the sampler 52 may comprise an electromechanical actuator, for example a solenoid driven actuator, and/or a mechanical pump arranged to transfer vapour from the sampling volume 10, 24 (as illustrated in FIG. 1*a*, FIG. 1*b*, FIG. 1*c*, FIG. 2, FIG. 3*a*, FIG. 3*b* and FIG. 4) through the sampling inlet 14 into the analytical apparatus.

A gate electrode 76 may separate the reaction region 58 from a drift chamber 62. The gate electrode 76 may comprise an assembly of at least two electrodes, which may be arranged to provide a Bradbury-Nielsen gate. The drift chamber 62 can comprise a collector 77 toward the opposite end of the drift chamber 62 from the gate electrode 76 for detecting ions. The drift chamber also comprises a drift gas inlet 74, and a drift gas outlet 60 arranged to provide a flow of drift gas along the drift chamber 62 from the ion collector 77 towards the gate 76. The sampler 52 can be operated by the controller 50 to obtain fluid from sampling volume 10, 24 (as illustrated in FIG. 1*a*, FIG. 1*b*, FIG. 1*c*, FIG. 2, FIG. 3*a*, FIG. 3*b* and FIG. 4) through the sampling inlet 14. The sampler 52 can also be operated to provide an obtained sample into the reaction region 58 of the spectrometer 68. The reaction region shown in FIG. 7 and FIG. 8 comprises an ioniser 56 for ionising a sample. The ioniser 56 may comprise a corona discharge ioniser. The drift chamber 62 may comprise drift electrodes 64, 70 for applying an electric field along the drift chamber 62 to move ions towards the collector 77 against the flow of the drift gas. Although the apparatus of FIG. 7 and FIG. 8 is illustrated as comprising two drift electrodes 64, 70, some embodiments may comprise more than two drift electrodes.

As explained above, detector inlets of the present disclosure find particular application in portable devices which may be used in hostile environments where dust and contaminants are prevalent. These detector inlets may be used with a variety of analytical apparatus, such as the mass spectrometer of FIG. 5 and FIG. 6 and the ion mobility spectrometer of FIG. 7 and FIG. 8, other kinds of analysers, spectrometers and/or chromatography apparatus. In addition, the detector inlet 1, 3 may have different configurations.

In some examples described above, the flow director comprises a single flow inlet and a single flow outlet. In other examples the flow director may comprise more than one flow inlet and more than one flow outlet. In an example the flow director comprises more flow outlets than flow inlets. The flow cross section of these inlets and outlets may be selected so that the total flow cross section of the flow outlets is greater than the total flow cross section area of the flow inlet (or inlets).

In the examples illustrated above, the surface of the flow director 1 directs the flow of fluid to induce circulatory flow in the fluid. The flow director 1 may also comprise an additional fluid path configured to direct additional gaseous fluid into the flow to create the circulatory flow. The additional fluid path may comprise one or more jets of fluid that are arranged to introduce fluid into the flow director altering the flow path of the fluid to create circulatory flow of the gaseous fluid.

In the example illustrated in FIG. 3*a* and FIG. 4 the fins are arranged on the wall of the flow passage in a helical arrangement so that the flow of the fluid is in a helical path along the flow passage. The fins may be arranged on the surface in a pattern other than a helical pattern to induce circulatory motion of the fluid along the flow passage in a path that is not helical, for example it fins may be at least partially tapered, for example into a cone shaped spiral. The fins are arranged to direct the fluid in an anti-clockwise helical path, the fins may also be arranged in a clockwise helical pattern so that the fluid flows in a clockwise helical path.

In the example illustrated in FIG. 3*a* and FIG. 4 the fins are arranged on the wall of the flow passage 32. The helical pattern may have a uniform pitch along the length of the helix. The helix may extend along at least a part of the flow passage, for example all of the flow passage. The pitch of the helical fins may also vary along the length of the flow passage, for example the pitch of the fins may be reduced in a portion of the flow passage so circulatory flow is such that the fluid undergoes more rotations about the axis of the flow passage for a given length of the flow passage.

In the example illustrated in FIG. 3*a* and FIG. 4 the flow director comprises fins that extend from the wall 33 of the flow passage 32. The flow director may also comprise a groove in the wall 33 of the flow passage 32 to direct the fluid in a circulatory path, for example the groove may be an indented region on the wall 33 of the flow passage 32, for example in the manner of a screw thread in a nut.

In the example illustrated in FIG. 3*a* and FIG. 4 the fins extend from the wall 33 of the flow passage 32. The fins may also extend from another part of the flow passage, for example the fins may extend from the flow inlet and/or flow outlet into the flow passage.

In the example illustrated in FIG. 3*a* and FIG. 4 the first fluid outlet 28 and the second fluid outlet 30 are positioned transverse to the flow passage 32. The fluid outlet 28 and/or the second fluid outlet 30 may also be at least partially aligned with the flow direction, for example the fluid outlet 28 and/or the second fluid outlet 30 may be oriented at 45 degrees with respect to the flow passage.

In the example illustrated in FIG. 3*a* and FIG. 4, the flow passage may be less than 20 mm wide. For example it may be less than 10 mm wide, for example less than 5 mm, for example less than 2 mm, for example less than 1.5 mm, for example less than 1 mm, for example less than 0.75 mm, for example less than 0.5 mm, for example less than 0.4 mm, for example less than 0.3 mm, for example less than 0.2 mm, for example less than 0.1 mm.

In the example illustrated in FIG. 3*a* and FIG. 4, the flow passage may be at least 10 microns wide, for example at least 0.1 mm wide. For example it may be at least 0.2 mm, for example at least 0.3 mm, for example at least 0.4 mm, for example at least 0.5 mm, for example at least 0.75 mm, for example at least 1 mm, for example at least 1.5 mm, for example at least 2 mm, for example at least 5 mm wide.

The detector inlet may further comprise a mover that moves the gaseous fluid around the circulatory flow. The mover may be arranged to blow an additional flow of gaseous fluid, such as a jet, around the internal surface of a wall of the flow passage or plenum.

The detector inlet may further comprise a heater to heat the gaseous fluid in the plenum. The heater may be configured to heat the flow of fluid, for example to heat the gaseous fluid to vapourise aerosol carried by the flow. In an example the heater is positioned in the flow inlet, flow passage and/or the plenum. The heater may comprise a resistive heater such as a filament heater, for example a membrane heater. Examples of heaters also include infrared light sources.

In the examples illustrated in FIG. 1*a* and FIG. 3, the flow inlet has a smaller flow cross section area than the flow outlet. The flow inlet may also have the same flow cross section as the flow outlet. In some examples it may have a larger flow cross section than the flow outlet.

In the example illustrated in FIG. 1*a* and FIG. 3 the circulatory flow circulates about a rotation axis that is transverse to the bulk flow direction. The circulatory flow may also circulate about a rotation axis that is in a direction other than transverse to the bulk flow direction, for example aligned to the bulk flow direction.

The detector inlets described herein are illustrated as being arrangements of conduits, such as hoses or pipes. As noted above however they may also be provided by channels, and plenums, which are cut into a block of material, and then enclosed. In such embodiments the flow passages and inlets described herein may not have a circular cross section.

It should also be appreciated that particular combinations of the various features described and defined in any aspects of the invention can be implemented and/or supplied and/or used independently. Other examples and variations will be apparent to the skilled addressee in the context of the present disclosure.

The invention claimed is:

1. A detector inlet for providing a sample to an analytical apparatus for detecting a substance of interest, the detector inlet comprising:
- a flow inlet for inhaling a flow of a gaseous fluid comprising a substance of interest and providing the flow of a gaseous fluid comprising the substance of interest to a plenum for allowing passage of the flow of a gaseous fluid comprising the substance of interest, the plenum comprising an enclosed internal volume and a sampling volume, wherein the plenum is arranged in fluid communication with the flow inlet and a flow outlet;
- a sampling inlet arranged in the plenum wherein the sampling inlet comprises a pinhole inlet arranged to collect samples of the gaseous fluid comprising the substance of interest from the sampling volume and to provide the samples to the analytical apparatus, wherein the flow of a gaseous fluid comprising the substance of interest carries particulates; and
- a flow director arranged to create circulatory flow of the gaseous fluid comprising the substance of interest from the flow inlet around the enclosed internal volume of the plenum encircling the sampling inlet thereby to vary a spatial distribution of the particulates carried by the gaseous fluid comprising the substance of interest to increase a relative proportion of the particulates carried past the sampling inlet to the flow outlet without entering the sampling volume.

2. The detector inlet of claim 1, wherein the plenum is arranged to direct the flow of a gaseous fluid in a flow direction and so that the circulatory flow circulates about an axis of rotation that is transverse to the flow direction.

3. The detector inlet of claim 2, wherein the flow director comprises a flow inlet to the plenum and a flow outlet from the plenum wherein the flow outlet is aligned to carry flow in a direction that is transverse to a direction of flow into the plenum from the inlet.

4. The detector inlet of claim 3, wherein the flow inlet has a smaller cross section than the flow outlet.

5. The detector inlet of claim 1, wherein the flow director comprises a curved wall of the plenum arranged so that the circulatory flow follows an internal surface of the curved wall of the plenum.

6. The detector inlet of claim 5, wherein varying the spatial distribution of particulates carried by the circulatory flow comprises decreasing the relative proportion of the particulates carried by the circulatory flow with distance from the curved wall of the plenum.

7. The detector inlet of claim 1, wherein the plenum is arranged to direct the flow of a gaseous fluid in a flow direction and is configured so that the circulatory flow circulates about an axis of rotation that is aligned with the flow direction.

8. The detector inlet of claim 7, wherein the plenum comprises a cylinder and the axis of rotation is aligned with a longitudinal axis of the cylinder.

9. The detector inlet of claim 7, wherein the flow director comprises a flow inlet to the plenum and a flow outlet from the plenum, and the flow inlet and the flow outlet are spaced apart in the flow direction.

10. The detector inlet of claim 1, wherein the flow director comprises a structure aligned with a helical path in the plenum.

11. The detector inlet of claim 1, wherein the flow director comprises a mover arranged to move gaseous fluid around the circulatory flow.

12. The detector inlet of claim 1, further comprising a heater to heat the gaseous fluid in the flow passage.

13. The detector inlet of claim 1, further comprising an additional fluid path configured to direct additional gaseous fluid into the flow of a gaseous fluid to create the circulatory flow.

14. A detector inlet for providing a sample to an analytical apparatus for detecting a substance of interest, the detector inlet comprising:
- a flow passage for carrying an inhaled flow of gaseous fluid comprising a substance of interest in a flow direction;
- a flow director arranged to create a circulatory flow of the gaseous fluid comprising the substance of interest around the flow passage, wherein the circulatory flow has an axis of rotation that is aligned with the flow direction thereby to vary a spatial distribution of particulates carried by the fluid; and a sampling inlet comprising a pinhole adapted to collect samples of the gaseous fluid from a sampling volume encircled by the circulatory flow.

15. The director inlet of claim 14, wherein the flow director comprises and additional fluid path configured to deliver an additional flow of gaseous fluid into the inhaled flow of a gaseous fluid to cause the circulatory flow.

16. The detector inlet of claim 14, wherein the flow director comprises a flow inlet to the flow passage and a flow outlet from the flow passage, and the flow inlet and the flow outlet are spaced apart along the direction of the axis of rotation, wherein the flow outlet comprises a first flow outlet and a second flow outlet, and the sampling inlet is arranged between the first flow outlet and the second flow outlet, and wherein the first flow outlet and the second flow outlet are at least partially aligned with the flow direction.

17. A method of detecting a substance of interest, the method comprising:

providing a flow of gaseous fluid comprising a substance of interest along a flow passage in a flow direction, the flow passage including a sampling volume;

inducing a circulatory flow of the gaseous fluid comprising the substance of interest within the flow passage;

obtaining samples of the gaseous fluid comprising the substance of interest through a sampling inlet from the sampling volume, wherein the sampling inlet comprises a pinhole and the circulatory flow encircles the sampling volume; and providing the samples to a detector for detecting the substance of interest.

18. The method of claim 17, wherein the flow passage comprises a plenum having a curved wall and the circulatory flow of the gaseous fluid follows an internal surface of the curved wall.

19. The method of claim 17, wherein the flow of gaseous fluid flows in a flow direction and the circulatory flow circulates about an axis of rotation that is transverse to the flow direction, wherein the flow of gaseous fluid flows from a flow inlet to a flow outlet and the flow outlet carries the flow of gaseous fluid in a direction that is transverse to a direction of flow of gaseous fluid from the flow inlet, and wherein the flow gaseous of fluid in the flow inlet is faster than the flow of gaseous fluid in the flow outlet.

* * * * *